(12) United States Patent
Kawamoto et al.

(10) Patent No.: US 9,653,854 B2
(45) Date of Patent: May 16, 2017

(54) POWER CORD

(71) Applicant: Panasonic Intellectual Property Management Co., Ltd., Osaka (JP)

(72) Inventors: Takashi Kawamoto, Mie (JP); Maki Kondou, Osaka (JP); Ryota Tomiyama, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/548,018

(22) Filed: Nov. 19, 2014

(65) Prior Publication Data
US 2015/0171567 A1   Jun. 18, 2015

(30) Foreign Application Priority Data
Dec. 13, 2013   (JP) .................................. 2013-257877

(51) Int. Cl.
| | |
|---|---|
| H01R 13/66 | (2006.01) |
| H01R 13/713 | (2006.01) |
| H01R 24/30 | (2011.01) |
| H01R 103/00 | (2006.01) |
| H02H 3/05 | (2006.01) |
| H02H 5/04 | (2006.01) |

(52) U.S. Cl.
CPC ....... *H01R 13/6683* (2013.01); *H01R 13/665* (2013.01); *H01R 24/30* (2013.01); *H01R 13/7137* (2013.01); *H01R 2103/00* (2013.01); *H02H 3/05* (2013.01); *H02H 5/04* (2013.01)

(58) Field of Classification Search
CPC .............. H01R 13/6683; H01R 13/665; H01R 13/7137; H01R 2103/00; H02H 5/04
USPC ...................................................... 439/620.21
See application file for complete search history.

(56) References Cited

U.S. PATENT DOCUMENTS

| | | | | |
|---|---|---|---|---|
| 5,862,030 A * | 1/1999 | Watkins, Jr. | ........... | H02H 5/043 219/494 |
| 8,325,454 B2 * | 12/2012 | Brugner | ............. | H01R 13/6683 361/103 |
| 8,680,442 B2 * | 3/2014 | Reusche | .................. | G01K 3/00 219/491 |
| 9,257,784 B2 * | 2/2016 | Kawamoto | .......... | H01R 13/424 |

(Continued)

FOREIGN PATENT DOCUMENTS

| | | |
|---|---|---|
| JP | 07-067245 A | 3/1995 |
| JP | 2002-352635 A | 12/2002 |
| WO | 2011/030970 A1 | 3/2011 |

OTHER PUBLICATIONS

Extended European Search Report issued in Application No. 14193974.4 dated May 8, 2015.

*Primary Examiner* — Amy Cohen Johnson
*Assistant Examiner* — Oscar C Jimenez
(74) *Attorney, Agent, or Firm* — McDermott Will & Emery LLP (57) ABSTRACT

A power cord includes a plug. The plug includes plural blades to be respectively inserted into plural blade insertion holes of an electrical outlet for connection. The plug further includes plural thermal sensors provided so that each of the plural blades corresponds to a thermal sensor. The power cord further includes a communication circuit that is configured to notify a control circuit of a load, when a temperature detected by any one of the plural thermal sensors is higher than a predetermined temperature.

4 Claims, 12 Drawing Sheets

(56) References Cited

U.S. PATENT DOCUMENTS

| | | | |
|---|---|---|---|
| 2009/0167537 A1* | 7/2009 | Feliss | B60L 3/0069 |
| | | | 340/584 |
| 2009/0251832 A1 | 10/2009 | Brugner et al. | |
| 2013/0070382 A1* | 3/2013 | Fabian | H02H 5/04 |
| | | | 361/103 |
| 2014/0070629 A1* | 3/2014 | Kondou | H02H 5/043 |
| | | | 307/117 |
| 2014/0073189 A1* | 3/2014 | Kondou | H01R 13/6683 |
| | | | 439/620.21 |
| 2015/0171568 A1* | 6/2015 | Kawamoto | H01R 13/6683 |
| | | | 439/620.08 |

* cited by examiner

POWER CORD

CROSS REFERENCE TO RELATED APPLICATIONS

The application is based upon and claims the benefit of priority of Japanese Patent Application No. 2013-257877, filed on Dec. 13, 2013, the entire contents of which are incorporated herein by reference.

TECHNICAL FIELD

The disclosure relates generally to power cords, and more particularly, to a power cord with a plug to be connected to an electrical outlet.

BACKGROUND ART

Conventionally, there has been proposed a power cord, which includes: a plug to be connected to an electrical outlet (or a socket); a thermal sensor that is configured to detect a temperature of the plug; and a cut-off device that is configured to cut-off, when an abnormal increase in temperature is detected by the thermal sensor, current flowing from the plug to a load (e.g., see JPH 07-67245 A). The plug includes two or more blades to be inserted into the electrical outlet and to be respectively in contact with two or more blade receivers within the electrical outlet so as to be electrically conducted with the blade receivers.

According to this type of power cord, even when abnormal heating occurs due to a contact failure or the like between the blades of the plug and the blade receivers in the electrical outlet, it is possible to prevent, by cutting-off the conduction, breakage of the plug, occurrence of a fire, or the like due to the heating.

Here, in a case where the number of thermal sensors is one, an output of the thermal sensor may be brought to have a relatively-low correlation with a temperature of a blade farthest from the thermal sensor, of the blades. Accordingly, a speed of a response to an increase in temperature due to the blade may become low, and safety may be reduced.

SUMMARY

It is an object of the present technology to provide a power cord, which can improve safety.

A power cord according to an aspect of the present invention includes a plug, and a load connecting part to be connected to a load. The plug includes: plural blades to be respectively inserted into plural blade insertion holes of an electrical outlet for connection; and plural thermal sensors provided so that each of the plural blades corresponds to at least one thermal sensor. Each thermal sensor is configured to detect a temperature of a corresponding blade. The load includes a control circuit that is configured to control an amount of current that enters the load through the plural blades and the load connecting part. The power cord further includes a communication circuit that is configured to notify the control circuit, when a temperature detected by any one of the plural thermal sensors is higher than a predetermined temperature.

According to the present technology, it is possible to more improve safety, compared with a case where the number of thermal sensors is one.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

A power cord according to an aspect of the present invention includes a plug (male plug) 1 (plug 1A), and a load connecting part 2 to be connected to a load (a vehicle 20). The plug 1 (plug 1A) includes: plural male connectors (plural blades) 11 (plural blades 11A) to be respectively inserted into plural apertures (plural blade insertion holes) 201 of an electrical outlet (socket) 200 for connection; and plural thermal sensors 5 (plural thermal sensors 5A) provided so that each of the plural male connectors (plural blades) 11 (plural blades 11A) corresponds to at least one thermal sensor 5 (thermal sensor 5A). Each thermal sensor 5 (thermal sensor 5A) is configured to detect (measure) a temperature of a corresponding male connector (blade) 11 (blade 11A). The load (vehicle 20) includes a control circuit 23 that is configured to control an amount of current that enters the load (vehicle 20) through the plural male connectors (plural blades) 11 (plural blades 11A) and the load connecting part 2. The power cord further includes a communication circuit 34 that is configured to notify the control circuit 23, when a temperature detected by any one of the plural thermal sensors 5 (plural thermal sensors 5A) is higher than a predetermined temperature.

In the above-mentioned power cord, it is preferred that each thermal sensor 5 (thermal sensor 5A) is provided so as to be in contact with the corresponding male connector (blade) 11 (blade 11A) in one-to-one.

In the above-mentioned power cord, it is preferred that a distance between each thermal sensor 5 (thermal sensor 5A) and the corresponding male connector (blade) 11 (blade 11A) is set smaller than a distance between any two of the plural male connectors (plural blades) 11 (plural blades 11A).

In the above-mentioned power cord, it is preferred that each thermal sensor 5 (thermal sensor 5A) is provided so as not to be disposed at a space between any two of the plural male connectors (plural blades) 11 (plural blades 11A).

In the above-mentioned power cord, it is preferred that the plug 1A further includes a sensor holder 9 that is made of insulating material and configured to hold the plural thermal sensors 5A, and at least part of the sensor holder 9 is provided to be disposed between each thermal sensor 5A and the corresponding male connector (blade) 11A.

Here, as one example, the plural male connectors 11 (plural male connectors 11A) are first and second male connectors 11a, 11b, and the plural apertures 201 are first and second apertures 201a, 201b. That is, the first and second male connectors 11a, 11b are configured to be inserted into the first and second apertures 201a, 201b, respectively. As one example, the electrical outlet 200 further includes a ground (earth) aperture 202, while the plug 1 (plug 1A) further includes a ground male connector 12 (ground male connector 12A) configured to be inserted into the ground aperture 202.

First Embodiment

Figure 2:
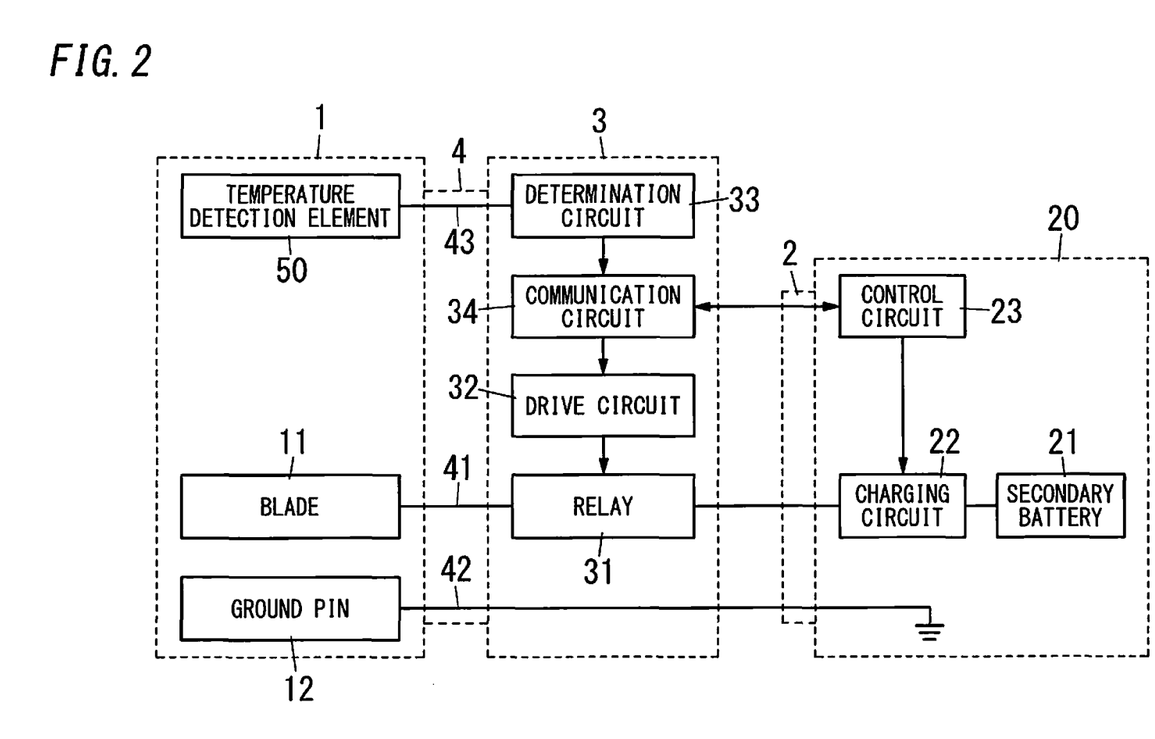
FIG. 2 is a block diagram illustrating a schematic configuration in the First Embodiment.
Figure 10:
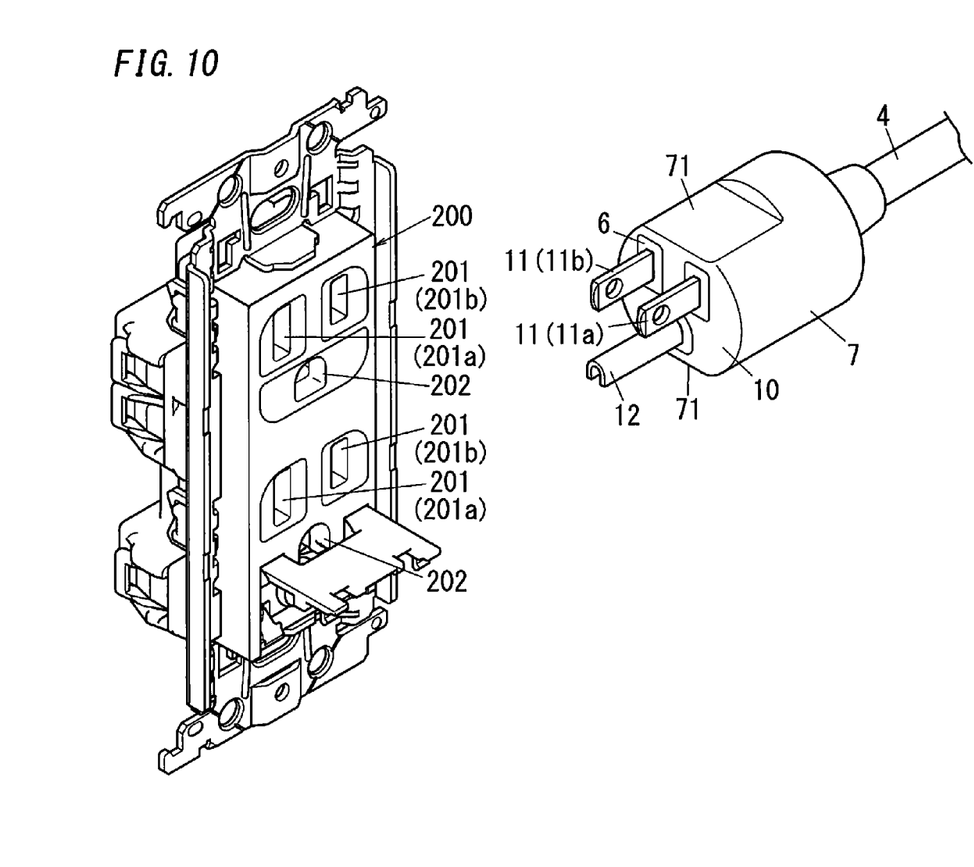
FIG. 10 is a perspective view of a power cord and an electrical outlet according to the First Embodiment.

As shown in FIG. 2, a power cord of the present embodiment includes: a plug 1 configured to be inserted into an electrical outlet 200 (see FIG. 10); a load connecting part 2 configured to be connected to a vehicle 20 as a load; and a cut-off device 3 configured to allow or stop electric power to be supplied to the load connecting part 2 from the plug 1.

In the present embodiment, the load connecting part 2 is, for example, a connector assembly in which the cut-off device 3 is put. In another example, the load connecting part 2 may be electric wires to be connected to terminals (for example, screw terminal blocks) of the vehicle 20. In this example, the cut-off device 3 is placed in the plug 1 or intervenes between both ends of a cable 4. Thus, a position of the cut-off device 3 is optional, and accordingly in the example of FIG. 2, the cut-off device 3 is shown separately from the load connecting part 2.

Figure 3:
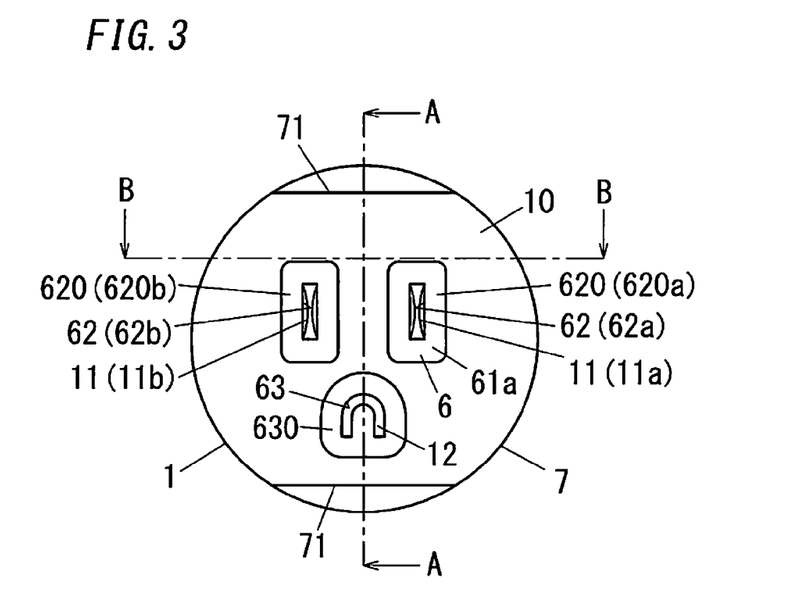
FIG. 3 is a front view of the plug according to the First Embodiment.
Figure 4:
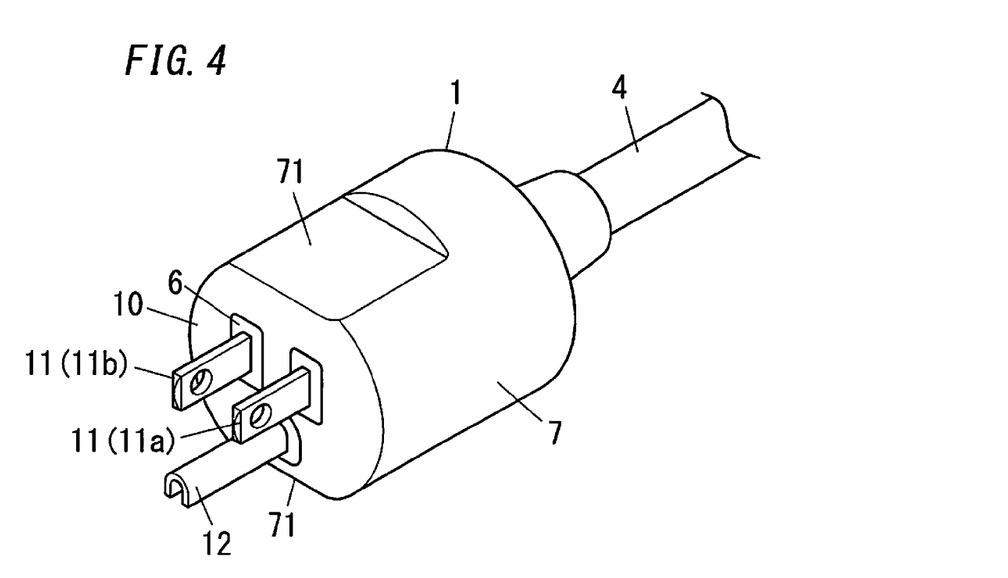
FIG. 4 is a perspective view of the plug according to the First Embodiment.

The plug 1 is, for example, a plug having two electrodes and a ground electrode, specified in JIS C 8303. As shown in FIGS. 3 and 4, the plug 1 includes two blades 11 (first and second male connectors 11a and 11b) for power supply corresponding to line (hot) and neutral, respectively, and a ground pin (ground male connector) 12 corresponding to ground. Each of the blades 11 and the ground pin 12 is made of, for example, electrically conductive material such as metal.

The blades 11 are connected to the cut-off device 3 through power wires 41 included in the cable 4 connecting the plug 1 and the cut-off device 3. The cut-off device 3 includes a relay 31 (e.g., an electromagnetic relay) and a drive circuit 32. The relay 31 is configured to make or break an electrical connection between one or two of the blades 11 and the load connecting part 2. The drive circuit 32 is configured to drive the relay 31. In FIG. 2, for simplification, only a set of one blade 11 and one temperature detection element 50 is shown. The relay 31 may include a single pole relay (switch) that has only one set of movable and fixed contacts intervening between one blade 11 (one power wire 41) and a corresponding one terminal in the load connecting part 2, and is configured to turn on and off power to the load connecting part 2 (namely the vehicle 20). Alternately, the relay 31 may include a dual pole relay (switch) that has a first set of movable and fixed contacts intervening between one blade 11 and a corresponding terminal in the load connecting part 2 and a second set of movable and fixed contacts intervening between the other blade 11 and the other corresponding terminal, and is configured to turn on and off power to the load connecting part 2. In addition, the relay 31 may further have a function like known circuit breakers, configured to interrupt (open) an electrical circuit in the case where a fault such as electric leakage or overcurrent is detected.

The ground pin 12 is connected to the load connecting part 2 through a ground wire 42 included in the cable 4.

Figure 5:
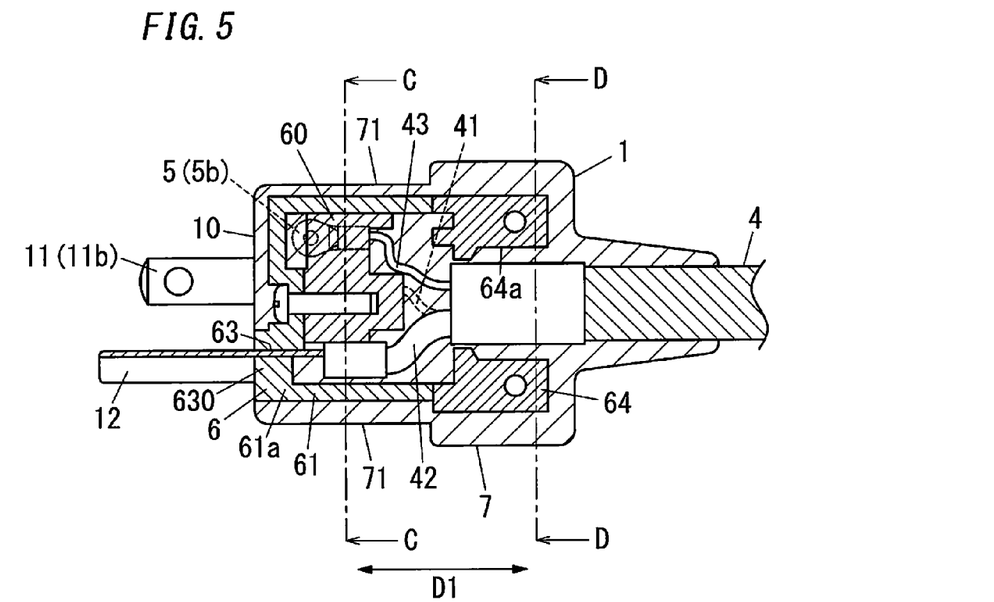
FIG. 5 is a sectional view of the plug according to the First Embodiment, taken along line A-A of FIG. 3.
Figure 6:
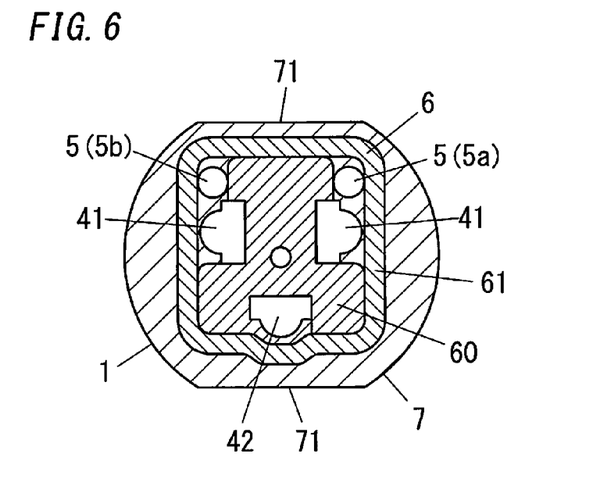
FIG. 6 is a sectional view of the plug according to the First Embodiment, taken along line C-C of FIG. 5.
Figure 7:
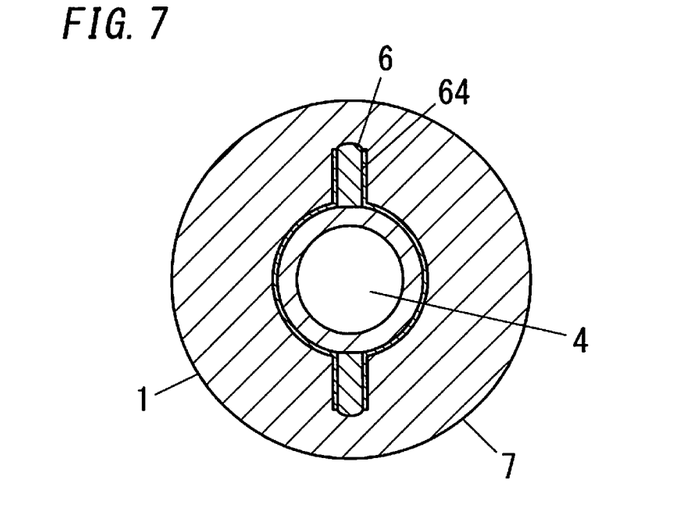
FIG. 7 is a sectional view of the plug according to the First Embodiment, taken along line D-D of FIG. 5.

As shown in FIGS. 5 to 7, the plug 1 includes a core 6 and an enclosure 7. The core 6 is made of an insulating material such as synthetic resin and retains the blades 11 and the ground pin 12. The enclosure 7 is a synthetic resin molding, in which the core 6 is sealed. The blades 11 and the ground pin 12 protrude from an end face 10 of the plug 1, toward a first side of a direction D1 (see FIG. 5; for the purpose of simplicity, in the present embodiment, referred to as "forward") perpendicular to the end face 10.

As shown in FIGS. 5 to 7, the core 6 includes an inner frame 60, a front cover 61 and a back cover 64. The inner frame 60 retains the blades 11 and the ground pin 12 by engagement for example. The front cover 61 is shaped like a cylinder with a bottom, which has, on a rear side thereof in the direction D1, an opening, and the blades 11 and the ground pin 12 are inserted into holes formed in a base 61a (front base) of the front cover 61. The back cover 64 has a through hole 64a (see FIG. 5) into which one end of the cable 4 is inserted, and is coupled to the rear side of the front cover 61. In detail, as shown in FIGS. 3 and 5, the base 61a is provided with: first and second through holes 62 (62a and 62b) into which the blades 11 (11a and 11b) are inserted, respectively; and (as an option) a ground through hole 63 into which the ground pin 12 is inserted. In more detail, the base 61a has, on the front surface, two bosses (protrusions) 620 (620a and 620b) on regions corresponding to the first and second apertures (201a and 201b) of the electrical outlet 200. The first and second through holes 62a and 62b are formed in centers of the bosses 620a and 620b, respectively. The base 61a further has (as an option), on the front surface, a boss (protrusion) 630 on a region corresponding to the ground aperture 202 of the electrical outlet 200. The ground through hole 63 is formed in a center of the boss 630.

As shown in FIGS. 5 to 7, the enclosure 7 is shaped like a column having an axis which is in parallel with an axis of the core 6 (i.e. an axis of the front cover 61) as a whole. The enclosure 7 is formed by molding synthetic resin. The enclosure 7 is formed to cover the core 6 so as to seal: the front surface (other than the front of the bosses 620a, 620b and 630) of the base 61a of the front cover 61; four side surfaces of the front cover 61; four side surfaces of the back cover 64; and the rear of the back cover 64. The lateral surface of the enclosure 7 is provided, on the front side, with a pair of recesses 71 formed in parallel with each other. The recesses 71 are formed along a width direction of the blades 11.

Figure 1:
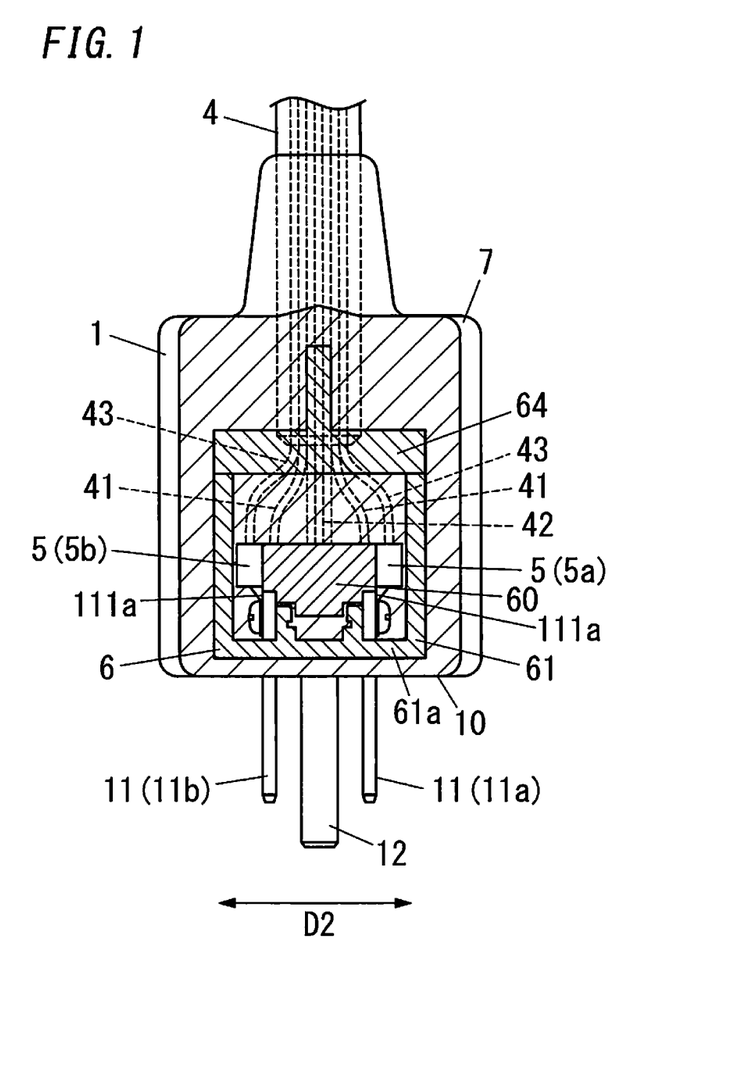
FIG. 1 is a sectional view of a plug according to First Embodiment, taken along line B-B of FIG. 3.
Figure 8:
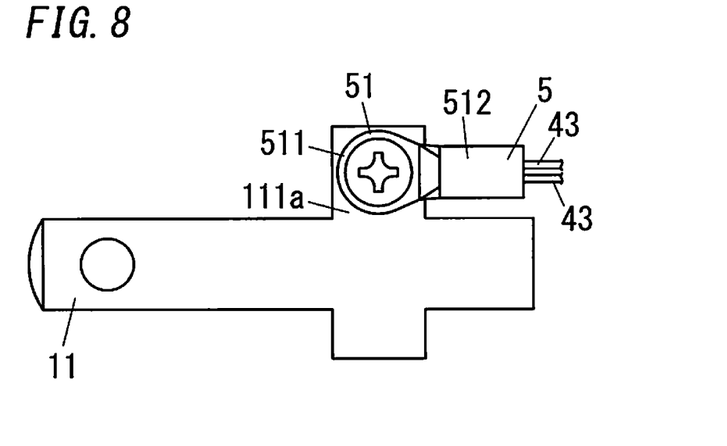
FIG. 8 is a side view of a blade (a male connector) according to the First Embodiment, in a state where a thermal sensor is fixed to the blade.
Figure 9:
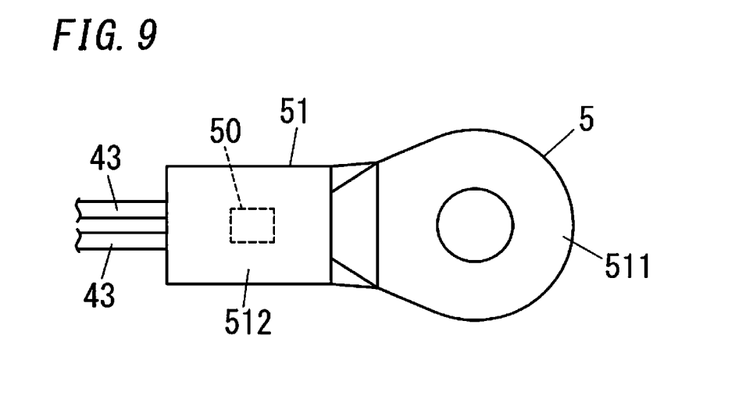
FIG. 9 is a side view of the thermal sensor according to the First Embodiment.

As shown in FIGS. 1 and 8, a single thermal sensor 5 is fixed to each blade 11. That is, in the present embodiment, two thermal sensors 5 (first and second thermal sensors 5a and 5b) are fixed to the two blades 11 (the first and second male connectors 11a and 11b), respectively. Each thermal sensor 5 includes a temperature detection element 50, and a metal-made holder 51 that holds the temperature detection element 50, as shown in FIG. 9. An example of the temperature detection element 50 is a temperature-sensitive resistor (so called a thermistor) having a comparatively large change in a resistance value in response to a temperature change. The holder 51 has the same structure as well-known lug terminal, as a whole. The holder 51 includes: a fixed portion 511 that has an annular shape and is to be fixed to a corresponding blade 11 by a screw; and a body portion 512 that houses the temperature detection element 50 therein. As shown in FIGS. 1 and 8, the fixed portion 511 of each thermal sensor 5 is fixed on one surface 111a of the corresponding blade 11, which faces outside in a horizontal direction (namely, a direction D2 shown in FIG. 1, in which the two blades 11 are arranged). The body portion 512 is disposed so that an axis thereof is in parallel with the direction D1, on the rear side of the fixed portion 511. The temperature detection element 50 of each thermal sensor 5 is connected to the cut-off device 3 through signal wires 43 drawn out backward from the body portion 512 of the holder 51. Regarding each thermal sensor 5, the temperature detection element 50 and conductive parts of one ends of the signal wires 43 are electrically insulated from the holder 51 by, for example, an epoxy resin (not shown) which enters the inside of the body portion 512 of the holder 51. The signal wires 43 are bundled together with the power wires 41 and the ground wire 42 to constitute the cable 4.

As a load to be connected to the load connecting part 2, a vehicle 20 such as a plug-in hybrid vehicle or an electric vehicle is assumed. The vehicle 20 includes a secondary battery 21, a charging circuit 22 that is configured to charge the secondary battery 21, and a control circuit 23 that is configured to control the charging circuit 22. Under control of the control circuit 23, charging current flowing from the charging circuit 22 to the secondary battery 21 is increased or decreased, and accordingly, current entering the vehicle 20 via the blades 11 and the load connecting part 2 is also increased or decreased.

The cut-off device 3 includes: a determination circuit 33 that is configured to determine, based on an output of each thermal sensor 5 (temperature detection element 50), whether or not the blades 11 are in an abnormally high-temperature state; and a communication circuit 34 that is configured to notify the control circuit 23 when the blades 11 are determined to be in the high-temperature state by the determination circuit 33. When receiving the notification, the control circuit 23 is configured to control the charging circuit 22 to reduce or stop the charging current flowing to the secondary battery 21. Accordingly, current flowing to the blades 11 is also reduced or stopped, and therefore it is possible to reduce the temperature of the blades 11. The communication circuit 34 may be configured to control the drive circuit 32 to turn off the relay 31 in response to a control signal transmitted by the control circuit 23 that received the notification.

In more detail, for example, the communication circuit 34 is configured to transmit or receive a voltage signal (referred to as a control pilot (CPLT) signal) to or from the control circuit 23 of the vehicle 20. That is, when the plug 1 is connected to the electrical outlet 200, the communication circuit 34 is activated by power supplied via the blades 11, and first sets a voltage value of the CPLT signal to a prescribed first voltage (e.g., 12V). When detecting that the voltage value of the CPLT signal agrees with the first voltage, the control circuit 23 of the vehicle 20 reduces the voltage value of the CPLT signal to a prescribed second voltage (e.g., 9V) that is lower than the first voltage. When detecting that the voltage value of the CPLT signal is reduced to the second voltage, the communication circuit 34 generates, as the CPLT signal, a rectangular wave having a prescribed frequency (e.g., 1 kHz), and sets a duty ratio (an ON-duty: a ratio of a period during which a voltage is at a high level) of this rectangular wave to a value depending on a current capacity of an electric circuit between the blades 11 and the load connecting part 2. For example, when the current capacity is 12 A, the communication circuit 34 sets the duty ratio to 20%, and when the current capacity is 20 A, the communication circuit 34 sets the duty ratio to 50%. When recognizing the current capacity indicated by the duty ratio, the control circuit 23 reduces a voltage value at the high level of the CPLT signal to a prescribed third voltage (e.g., 6V) that is lower than the second voltage. When detecting that the voltage value at the high level of the CPLT signal is reduced to the third voltage, the communication circuit 34 controls the drive circuit 32 to turn on the relay 31 and start the power supply to the charging circuit 22 through the blades 11 and the load connecting part 2. Accordingly, the charging circuit 22 starts charging of the secondary battery 21. During the charging of the secondary battery 21 by the charging circuit 22, the control circuit 23 controls the charging circuit 22 so that a maximum value of the charging current flowing to the secondary battery 21 does not exceed the above-mentioned current capacity. In addition, during operation of the charging circuit 22, the control circuit 23 changes the maximum value of the charging current flowing from the charging circuit 22 to the secondary battery 21 in response to a change in the duty ratio of the CPLT signal. Furthermore, the control circuit 23 monitors a voltage of the secondary battery 21, and, when the voltage of the secondary battery 21 reaches a prescribed target value, returns the voltage value at the high level of the CPLT signal from the third voltage to the second voltage. When detecting that the voltage value at the high level of the CPLT signal is returned to the second voltage, the communication circuit 34 controls the drive circuit 32 to turn off the relay 31 and set the voltage value of the CPLT signal to the first voltage.

In the case of using the CPLT signal as described above, the notification related to the high-temperature state is achieved by changing the duty ratio of the CPLT signal to reduce the current capacity to be sent to the control circuit 23. However, in order to actually reduce current, it is required that the current capacity to be sent through the changed duty ratio is lower than a current value of the charging current flowing from the charging circuit 22 to the secondary battery 21 just before changing of the duty ratio. That is, it is required that the current capacity to be sent when the communication circuit 34 is activated is at least higher than a minimum value of the current capacity capable of indicating with the CPLT signal. Note that, in a case where the control circuit 23 is configured to stop the charging circuit 22 when the duty ratio of the CPLT signal agrees with a prescribed value (for example, zero), the notification related to the high-temperature state may be achieved by changing the duty ratio of the CPLT signal to the prescribed value.

According to the above configuration, it is possible to more improve safety, compared with a case where the number of thermal sensors is one.

Here, regarding each thermal sensor 5, the fixed portion 511 of the holder 51 is provided so as to be in contact with the corresponding blade 11 in one-to-one. In addition, a distance between each thermal sensor 5 and the corresponding blade 11 is set smaller than a distance between the blades 11. Therefore, an output of each thermal sensor 5 can be brought to have a higher correlation with a temperature of the corresponding blade 11, compared with a case where a clearance is provided between each thermal sensor 5 and the corresponding blade 11, or a case where the distance between each thermal sensor 5 and the corresponding blade 11 is set larger than the distance between the blades 11.

Further, each thermal sensor 5 is fixed on one surface 111*a* of the corresponding blade 11 that is on an opposite side of the corresponding blade 11 from a side of the other blade 11, and that is, each thermal sensor 5 is provided so as not to be disposed at a space between the blades 11. Therefore, the output of the each thermal sensor 5 is further prevented from being affected by a temperature of the other blade 11 (not the corresponding blade 11) and accordingly can be brought to have a higher correlation with a temperature of the corresponding blade 11, compared with a case where each thermal sensor 5 is disposed at the space between the blades 11. In addition, short-circuit hardly occurs between the blades 11 via the thermal sensors 5, compared with the case where each thermal sensor 5 is disposed at the space between the blades 11.

Second Embodiment

Hereinafter, basic constituent elements of the present embodiment are similar to those of the First Embodiment, and accordingly explanations thereof are appropriately omitted.

As shown in FIGS. 11 to 14, a core 6A of the present embodiment includes: a body 8 that has two first through holes 81 and a second through hole 82 into which two blades 11A and a ground pin 12A are inserted, respectively; and a sensor holder 9 that is configured to hold two thermal sensors 5A and is coupled to the body 8. The body 8 and the sensor holder 9 are made of synthetic resin for example. A front surface of the body 8 is exposed from a front surface of a plug 1A without being covered by an enclosure 7A.

Figure 11:
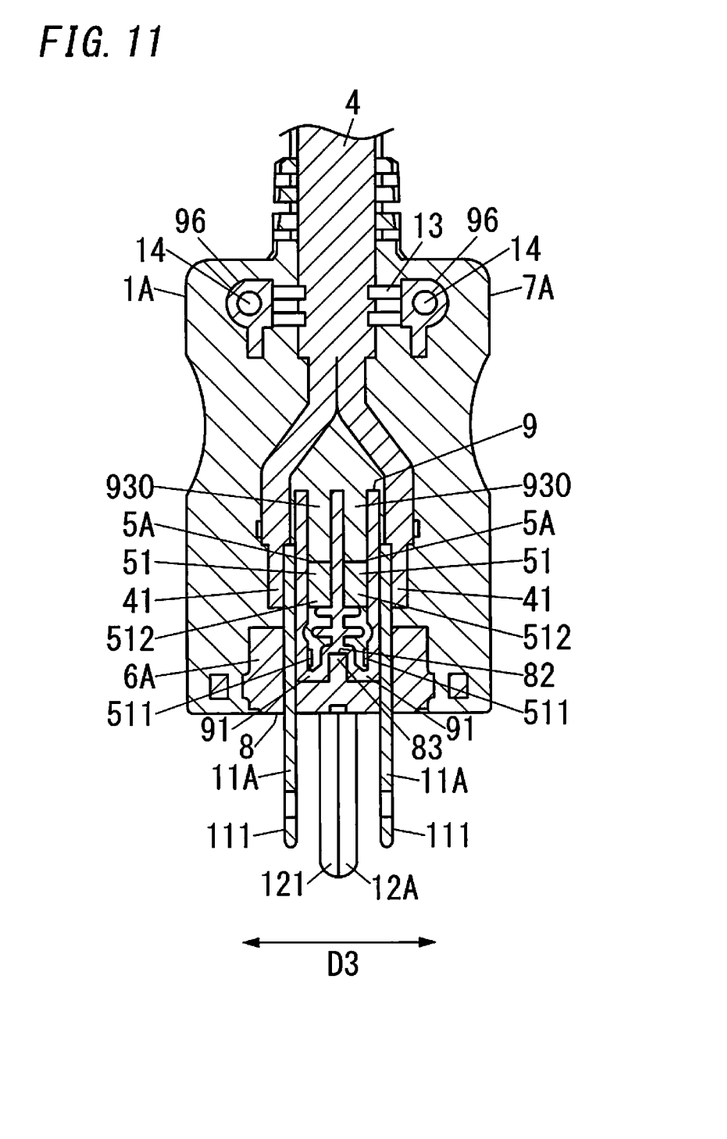
FIG. 11 is a sectional view of a plug according to Second Embodiment, taken along line E-E of FIG. 12.
Figure 12:
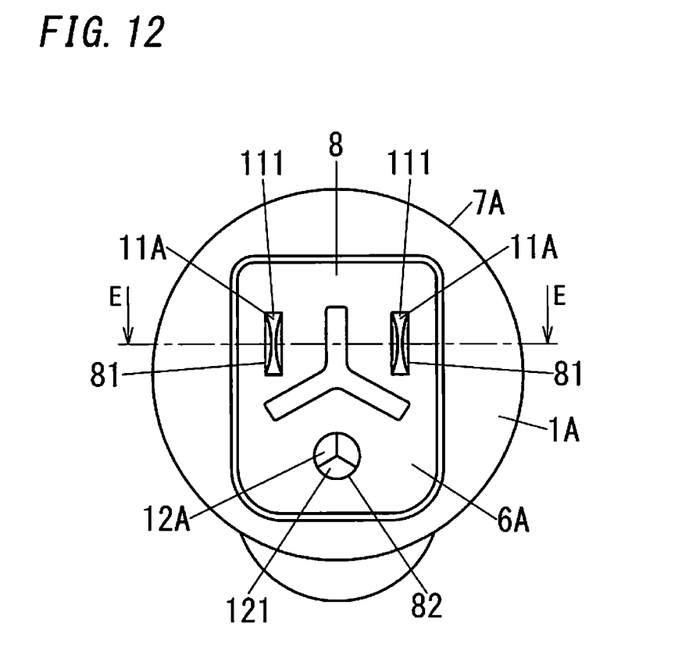
FIG. 12 is a front view of the plug according to the Second Embodiment.
Figure 13A:
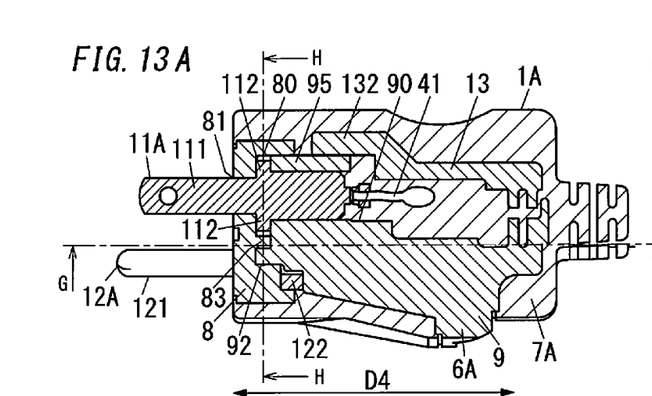
FIG. 13A is a sectional view of the plug according to the Second Embodiment, taken along line F-F of FIG. 13C.
Figure 13B:
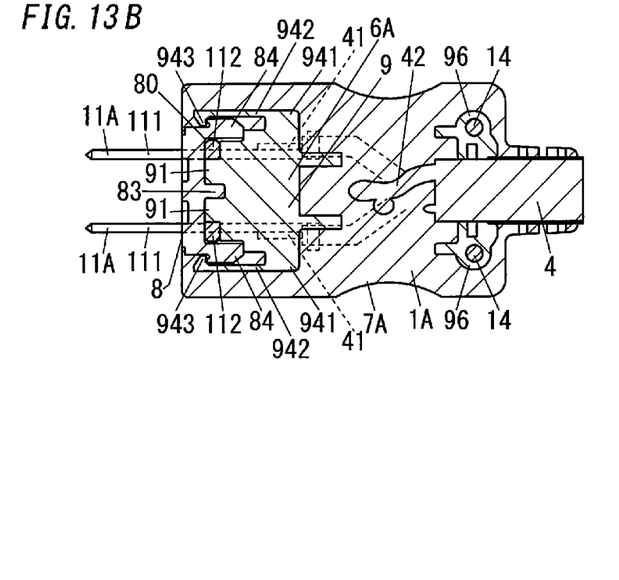
FIG. 13B is a sectional view of the plug according to the Second Embodiment, taken along line G-G of FIG. 13A.
Figure 13C:
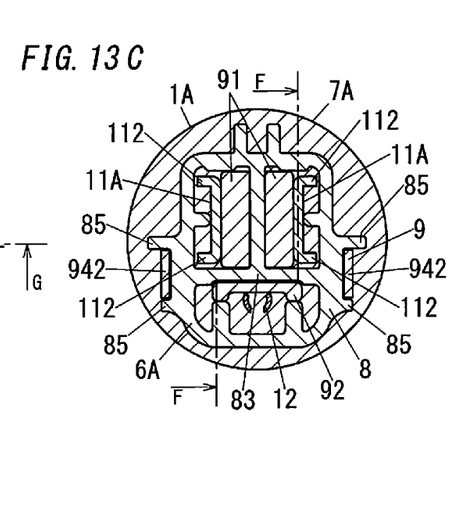
FIG. 13C is a sectional view of the plug according to the Second Embodiment, taken along line H-H of FIG. 13A.
Figure 14:
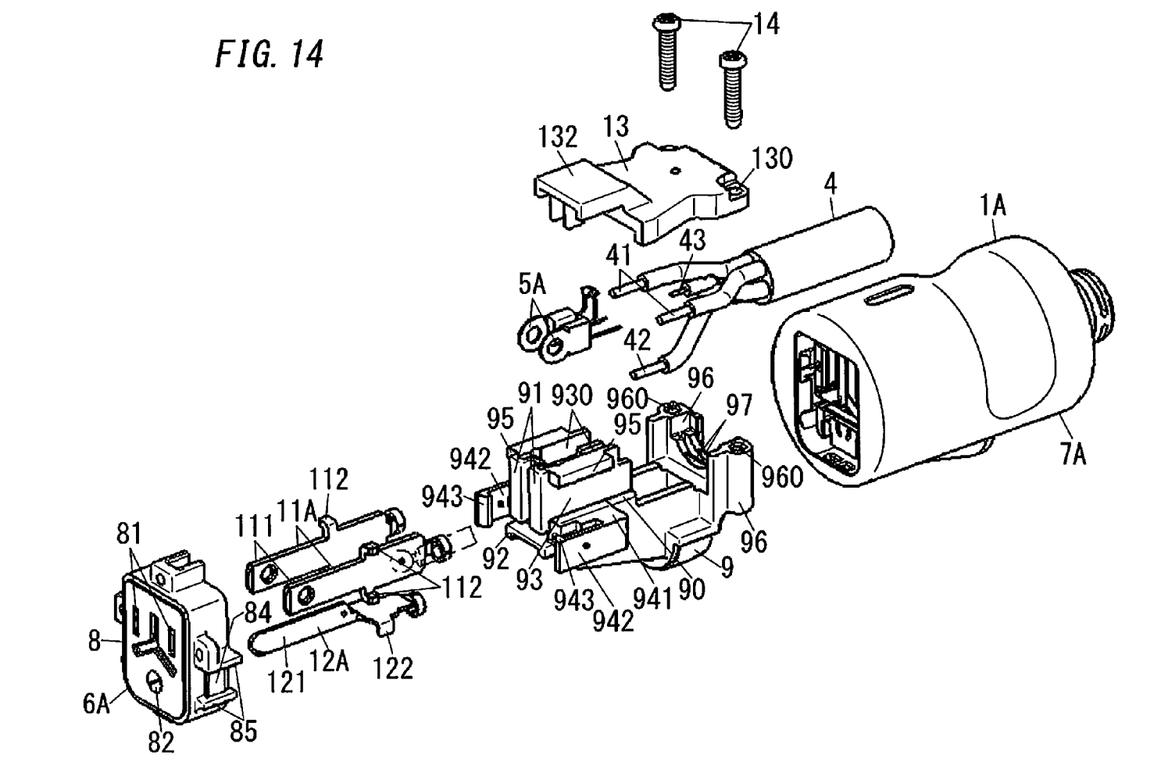
FIG. 14 is an exploded perspective view of the plug according to the Second Embodiment.
Figure 15A:
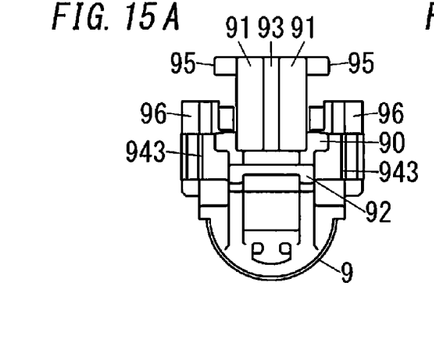
FIG. 15A is a front view of a sensor holder according to the Second Embodiment.
Figure 15B:
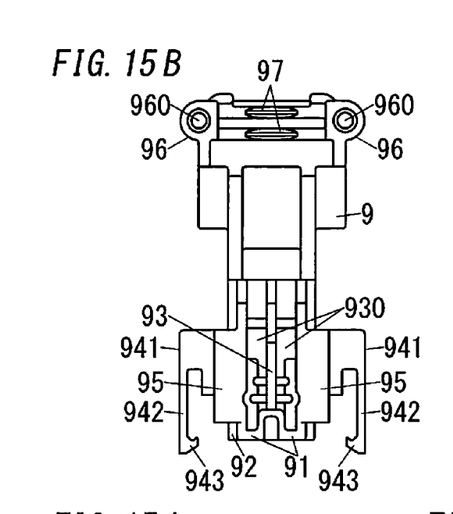
FIG. 15B is a plan view of the sensor holder according to the Second Embodiment.
Figures 15C, 15D:
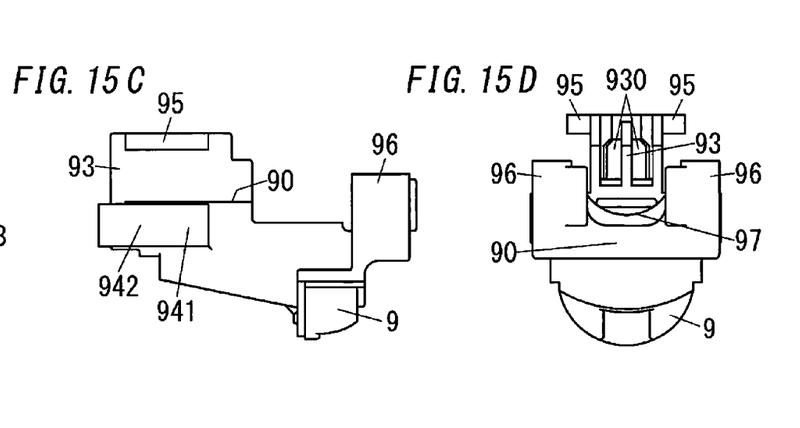
FIG. 15C is a right side view of the sensor holder according to the Second Embodiment.
FIG. 15D is a rear view of the sensor holder according to the Second Embodiment.

Each blade 11A includes a flat projecting part 111 that projects forward from the core 6A while a thickness direction of the projecting part 111 is in parallel with a horizontal direction (namely, a direction D3 shown in FIG. 11, in which two blades 11A are arranged). Two projecting parts 111 of the two blade 11A are inserted into the first and second apertures 201*a*, 201*b* of the electrical outlet 200 as described in the First Embodiment, and accordingly come into contact with blade receivers (not shown) corresponding to line (hot) and neutral to be electrically conducted, respectively. Each blade 11A further includes two stoppers 112 that respectively project from the projecting part 111 toward a first side and a second side of a vertical direction (a direction perpendicular to a direction in which the projecting part 111 projects from the core 6A).

The ground pin 12A includes a projecting part 121 that has a cylinder shape and projects forward from the core 6A while an axis direction of the projecting part 121 is in parallel with a front-back direction (a direction D4 shown in FIG. 13A) (in the embodiment, a first side of the direction D4 is referred to as "forward"). The projecting part 121 is inserted into the ground aperture 202 of the electrical outlet 200 as described in the First Embodiment, and accordingly comes into contact with a receiver (not shown) corresponding to ground to be electrically conducted. The ground pin 12A further includes two stoppers 122 that respectively project from the projecting part 121 toward a first side and a second side of the horizontal direction (namely, the direction D3) (a direction perpendicular to the direction in which the projecting part 111 projects from the core 6A).

The body 8 is provided in a rear surface thereof with a recess 80 that houses therein parts of the blades 11A and ground pin 12A. In the bottom surface of the recess 80, the two first through holes 81 are provided, into which the respective projecting parts 111 of the blades 11A are inserted, and further the second through hole 82 is provided, into which the projecting part 121 of the ground pin 12A is inserted. The respective first through holes 81 and second through hole 82 have sizes and shapes that the projecting parts 111 and projecting part 121 can be inserted but the stoppers 112 and stoppers 122 cannot be inserted. The first through holes 81 are arranged in the horizontal direction, and the second through hole 82 is provided below a position between the first through holes 81.

Regarding the body 8, the recess 80 is provided at an inner bottom surface thereof (that is, a rear surface of the body 8) with a T-shaped partition wall 83 that projects backward and is configured to separate between the two blades 11A, and separate between the ground pin 12A and each blade 11A.

As shown in FIGS. 15A to 15D, the sensor holder 9 includes: a body portion 90 that is disposed below the blades 11A; a wall portion 93 that projects upward from the body portion 90 and is sandwiched between the blades 11A; and two clipping portions 95 that respectively project toward the first side and second side of the horizontal direction from a top end of the wall portion 93, each of which is configured to clip a corresponding blade 11A between itself and the body portion 90.

The sensor holder 9 is provided at a front end part thereof with two first projections 91 and a second projection 92. Each first projection 91 is inserted into the recess 80 and is sandwiched between a corresponding blade 11A and the partition wall 83. The second projection 92 is inserted into the recess 80 and is sandwiched between the ground pin 12A and the partition wall 83. Part of the partition wall 83 is sandwiched between the two first projections 91, and part of the partition wall 83 is sandwiched between each first projection 91 and the second projection 92, and accordingly, the body 8 and the sensor holder 9 are positioned with respect to each other.

Further, the sensor holder 9 includes: two spring bases 941 that respectively project in the first side and the second side of the horizontal direction from near the front end of the body portion 90; and two spring pieces 942 that respectively project forward from the two spring bases 941. Each spring piece 942 has a flat plate shape and a thickness direction thereof is in parallel with the horizontal direction and is elastically deformable, and accordingly, a front end thereof can be displaced in the horizontal direction. The front end of each spring piece 942 is provided on an inner surface in the horizontal direction with an engaging claw 943 that projects. The body 8 is provided on both surfaces in the horizontal direction with engaged projection portions 84 that projects, respectively. While the body 8 is held by the spring pieces 942 in the horizontal direction, the respective engaging claws 943 engage with the engaged projection portions 84 (that is, the respective engaging claws 943 abut on the engaged projection portions 84 from the front side thereof), and accordingly, the body 8 is coupled to the sensor holder 9. Each engaged projection portion 84 has, at a rear end thereof, an inclined surface, which is inclined so that a projection size thereof is smaller as goes backward. Each engaging claw 943 has, at a front end thereof, an inclined surface, which is inclined so that a projection size thereof is smaller as goes forward. In order to couple the body 8 and the sensor holder 9 to each other, the body 8 is pressed between the spring pieces 942 from the rear of the sensor holder 9 while the respective positions of the engaged projection portions 84 in the vertical direction are adjusted to the positions of the engaging claws 943 in the vertical direction. Accordingly, the inclined surface of each engaged projection portion 84 and the inclined surface of a corresponding engaging claw 943 are slid on each other, and therefore each spring piece 942 is elastically deformed, and then when each engaged projection portion 84 reaches the front side of the corresponding engaging claw 943, each spring piece 942 is elastically retuned and thereby each engaging claw 943 engages with a corresponding engaged projection portion 84. Note that, the body 8 is provided on each of both surfaces in the horizontal direction with a pair of holding projection portions 85 that holds a corresponding spring piece 942 of the sensor holder 9 in the vertical direction.

A cable 4 is drawn out toward the rear of the core 6A while an axis direction of the cable 4 is in parallel with the front-back direction (direction D4). The body portion 90 of the sensor holder 9 is provided at a rear end thereof with two screw stoppers 96 that project upward, and hold the cable 4 in the horizontal direction (that is, a radial direction of the cable 4).

The plug 1A of the present embodiment further includes a tension stopper 13 that holds the cable 4 between itself and the core 6A (the sensor holder 9), and is insert molded to the enclosure 7A together with the core 6A. The tension stopper 13 is made of synthetic resin for example. Each screw stopper 96 of the sensor holder 9 has, in a top surface thereof, a screw hole 960 that is open. The tension stopper 13 is provided with two screw through-holes 130 that are respectively communicated with two screw holes 960. The tension stopper 13 is fixed to the sensor holder 9 by two screws 14 that are inserted into the two screw through-holes 130 and screwed in the two screw holes 960, respectively.

The sensor holder 9 is further provided with two biting projections 97 that project between the screw stoppers 96, and each biting projection 97 has a flat plate shape, of which a thickness direction agrees with the front-back direction (that is, a longitudinal direction of the cable 4). Also, the tension stopper 13 is further provided with two biting projections 131 that project, and each biting projection 131 has a flat plate shape, of which a thickness direction agrees with the front-back direction (that is, the longitudinal direction of the cable 4). In a state where the sensor holder 9 and the tension stopper 13 are coupled to each other, a distance between one biting projection 97 and one biting projection 131 facing the one biting projection 97 (also, a distance between the other biting projection 97 and the other biting projection 131 facing the other biting projection 97) is set smaller than an outer diameter of the cable 4 that is not in a deformed state. That is, it is possible to prevent the cable 4 from being displaced with respect to the core 6A by each biting projection 97 and each biting projection 131 biting the cable 4.

In a stage before the enclosure 7A is formed, inner surfaces of the two first through holes 81 and the second through hole 82 of the body 8 prohibit the blades 11A and the ground pin 12A from being displaced in the vertical direction or the horizontal direction with respect to the core 6A, respectively. In addition, the two first through holes 81 and the second through hole 82 of the body 8 have sizes and shapes that the stoppers 112 of the blades 11A and the stoppers 122 of the ground pin 12A cannot be inserted, respectively. Therefore, the stoppers 112 and the stoppers 122 abut on an inner bottom surface of the recess 80 of the body 8, and thereby, the blades 11A and the ground pin 12A are prohibited from being displaced (removed) forward (that is, toward the projecting direction of the projecting parts 111 and 121) with respect to the core 6A. Furthermore, the sensor holder 9 is disposed on the rear sides of the stoppers 112 of the blades 11A and the stoppers 122 of the ground pin 12A. Therefore, the sensor holder 9 abuts on the stoppers 112 and the stoppers 122, and thereby, the blades 11A and the ground pin 12A are prohibited from being displaced backward (that is, toward a direction opposite to the projecting direction of the projecting parts 111 and 121) with respect to the core 6A.

Figure 16:
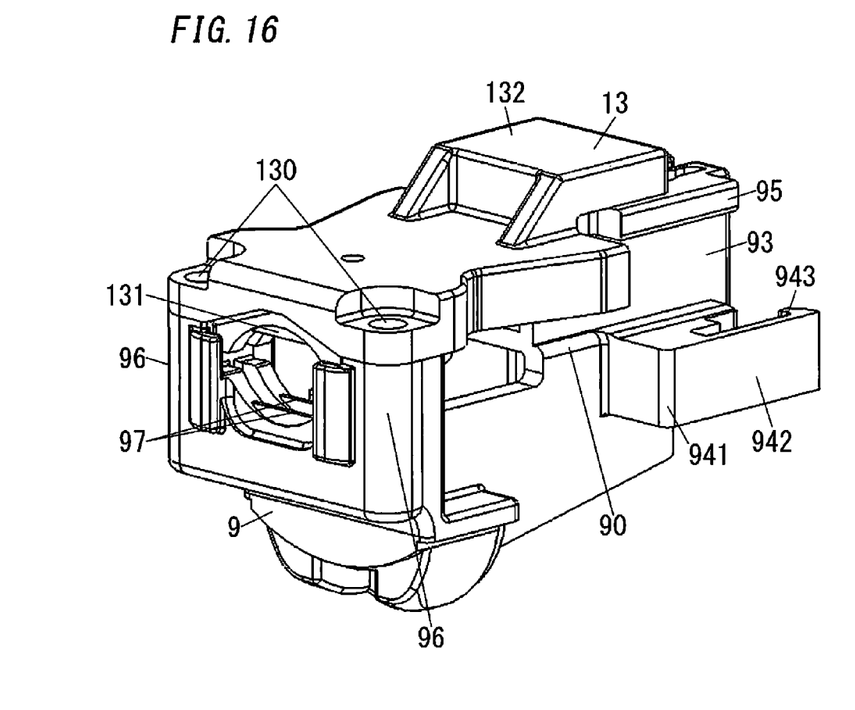
FIG. 16 is a perspective view of the sensor holder and a tension stopper according to the Second Embodiment, in a state where the sensor holder and the tension stopper are coupled to each other.

The respective thermal sensors 5A are fitted into two sensor housing recesses 930 that are open from an upper part of the wall portion 93 of the sensor holder 9 to a rear part thereof, and thereby, are held by the sensor holder 9. That is, part of the sensor holder 9 is provided to be disposed between each thermal sensor 5A and a corresponding blade 11A. Note that, as shown in FIG. 16, the tension stopper 13 includes a cover 132 that covers the sensor housing recesses 930 while being coupled to the sensor holder 9.

Figure 17:
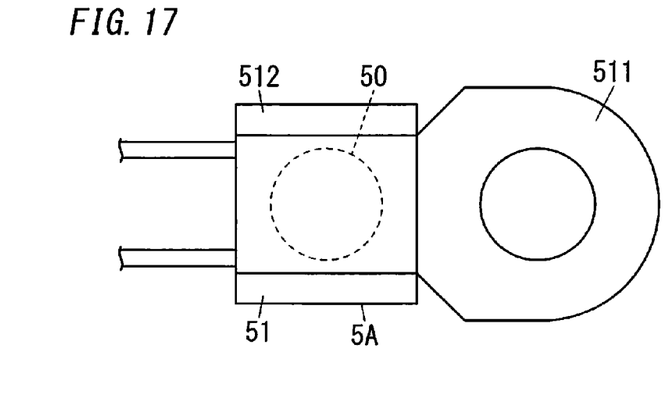
FIG. 17 is a side view of a thermal sensor according to the Second Embodiment.

Note that, an outer shape of the plug 1A and outer shapes of the thermal sensors 5A shown in FIG. 17 are slightly different from those of the First Embodiment. However, because those differences are not important for the present teaching and various modifications may be appropriately made, explanations thereof are omitted.

According to the above-mentioned configuration, by the sensor holder 9, it is possible to improve insulation capability between each thermal sensor 5A (each temperature detection element 50) with a corresponding signal wire 43, and the corresponding blade 11A with a corresponding power wire 41.

Note that, the body 8 and the sensor holder 9 may be coupled to each other by screws instead of the above-mentioned engagement, or by both of screws and the above-mentioned engagement.

In addition, each power wire 41 may be provided with a through hole (not shown), and fixed to a corresponding blade 11A or the sensor holder 9 by a caulking projection (not shown) formed at the corresponding blade 11A or the sensor holder 9 being inserted into this through hole and being caulked.

Those teachings may be used for a plug for three-phase alternating current, which includes three blades.

In each of the above-mentioned First and Second embodiments, the plug 1 (plug 1A) includes, as the first and second male connectors, two blades 11 (blades 11A) corresponding to line (hot) and neutral, each being shaped like a rectangle having a length (protruding length) and a width and arranged so that width directions of which are parallel with each other (see FIG. 10), such as JIS C 8303 plug, NEMA 1-15 plug, NEMA 5-15 plug or the like, but the present teaching is not limited to this. For example, the plug of the present teaching may include as the first and second male connectors: two blades having rectangle shapes which extend in a same plane, such as BS 1363 plug or the like; two blades forming a V-shape or an upside down V-shape, such as CPCS-CCC plug, AS/NZS 3112 plug or the like; or two round pins such as BS 546 plug, BS 4573 plug, CEE 7/4 plug, CEE 7/5 plug, CEE 7/16 plug, CEE 7/17 plug, 107-2-D1 plug, CEI 23-16/VII plug, SEV 1011 plug, IEC 60906-1 plug, TIS 166-2549 plug or the like.

In each of the above-mentioned First and Second embodiments, the plug 1 (plug 1A) further includes, as a ground male connector (option), the ground pin 12 (ground pin 12A) which has a U-shape cross-section (see FIG. 10), but the present teaching is not limited to this. For example, the plug of the present teaching may include as ground connector: two ground (earth) contacts put in recesses of the plug such as CEE 7/4 plug or the like; a ground blade such as AS/NZS 3112 plug, BS 1363 plug or the like; a half round ground pin such as 107-2-D1 plug or the like; or a round ground pin such as CEI 23-16/VII plug, SEV 1011 plug, NEMA 5-15 plug, TIS 166-2549 plug or the like.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A power cord, comprising a plug, and a load connecting part to be connected to a load, the plug comprising:

plural blades to be respectively inserted into plural blade insertion holes of an electrical outlet for connection; and plural thermal sensors provided so that each of the plural blades corresponds to at least one thermal sensor, each thermal sensor being configured to detect a temperature of a corresponding blade, wherein the load includes a control circuit that is configured to control an amount of current that enters the load through the plural blades and the load connecting part, and wherein the power cord further comprises a communication circuit that is configured to notify the control circuit, when a temperature detected by any one of the plural thermal sensors is higher than a predetermined temperature, wherein the plug further comprises a sensor holder that is made of insulating material and configured to hold the plural thermal sensors, at least part of the sensor holder being provided to be disposed between each thermal sensor and the corresponding blade, and wherein the sensor holder includes sensor housing recesses, the plural thermal sensors being respectively fitted into the sensor housing recesses to be held by the sensor holder.

2. The power cord according to claim 1, wherein a distance between each thermal sensor and the corresponding blade is set smaller than a distance between any two of the plural blades.

3. The power cord according to claim 2, wherein each thermal sensor is provided so as not to be disposed at a space between any two of the plural blades.

4. The power cord according to claim 1, wherein each thermal sensor is provided so as not to be disposed at a space between any two of the plural blades.

* * * * *